United States Patent
Willis et al.

(10) Patent No.: US 7,970,723 B2
(45) Date of Patent: Jun. 28, 2011

(54) DEFINING EXTENSIBLE EXPRESSION BEHAVIOR IN A RULES SYSTEM

(75) Inventors: Jurgen A. Willis, Woodinville, WA (US); Donald J. McCrady, Redmond, WA (US); John A. Rummell, Bothell, WA (US)

(73) Assignee: Microsoft Corporation, Redmond, WA (US)

(*) Notice: Subject to any disclaimer, the term of this patent is extended or adjusted under 35 U.S.C. 154(b) by 1171 days.

(21) Appl. No.: 11/512,986

(22) Filed: Aug. 30, 2006

(65) Prior Publication Data
US 2008/0059269 A1 Mar. 6, 2008

(51) Int. Cl.
*G06N 5/00* (2006.01)
*G06N 5/04* (2006.01)

(52) U.S. Cl. .......................................... 706/47; 712/236
(58) Field of Classification Search ..................... 706/47
See application file for complete search history.

(56) References Cited

U.S. PATENT DOCUMENTS

| | | | |
|---|---|---|---|
| 5,644,770 A | 7/1997 | Burke et al. | |
| 6,008,806 A | 12/1999 | Nakajima et al. | |
| 6,104,874 A | 8/2000 | Branson et al. | |
| 6,182,277 B1 | 1/2001 | DeGroot et al. | |
| 6,275,979 B1 | 8/2001 | Graser et al. | |
| 6,360,357 B1 | 3/2002 | Cesare | |
| 6,480,856 B1 | 11/2002 | McDonald et al. | |
| 6,999,102 B2 | 2/2006 | Felser et al. | |
| 2006/0101431 A1 | 5/2006 | Pepin et al. | |

OTHER PUBLICATIONS

Rausch-Schott, TRIGSflow Workflowmanagement Based on Active Object-Oriented Database Systems and Extended Transactionmechanisms, Feb. 1997.*
Fisher, et al., "A Delegation based Object Calculus with Subtyping", http://scholar.google.com/url?sa=U&q=http://www.research.att.com/~kfisher/files/fct95.ps, 1995.
Foster, et al., "Flow-Sensitive Type Qualifiers", Date: 2002, pp. 1-12, ACM Press, New York, NY, USA, http://delivery.acm.org/10.1145/520000/512531/p1-foster.pdf?key1=512531&key2=3912509411&coll=GUIDE&dl=GUIDE&CFID=72439609&CFTOKEN=25429963.
Hedin, et al., "JastAdd an aspect-oriented compiler construction system", Date: May 29, 2002, http://www.cs.lth.se/home/Gorel_Hedin/publications/2003-JastAdd-SCP-Preprint.pdf.

* cited by examiner

*Primary Examiner* — Jeffrey A Gaffin
*Assistant Examiner* — Nathan H Brown, Jr.

(57) ABSTRACT

Described herein is technology for, among other things, enabling use of custom expressions in a rules engine. The rules engine may be used in conjunction with a workflow. The technology involves providing a custom expression with access to validation context and execution context of the workflow. The custom expression can then participate in rules engine validation and execution. Furthermore, the technology allows for variables of the custom expression to be analyzed so that the rules engine can discover the variable dependencies of the custom expression and any side effects that drive forward chaining.

18 Claims, 6 Drawing Sheets

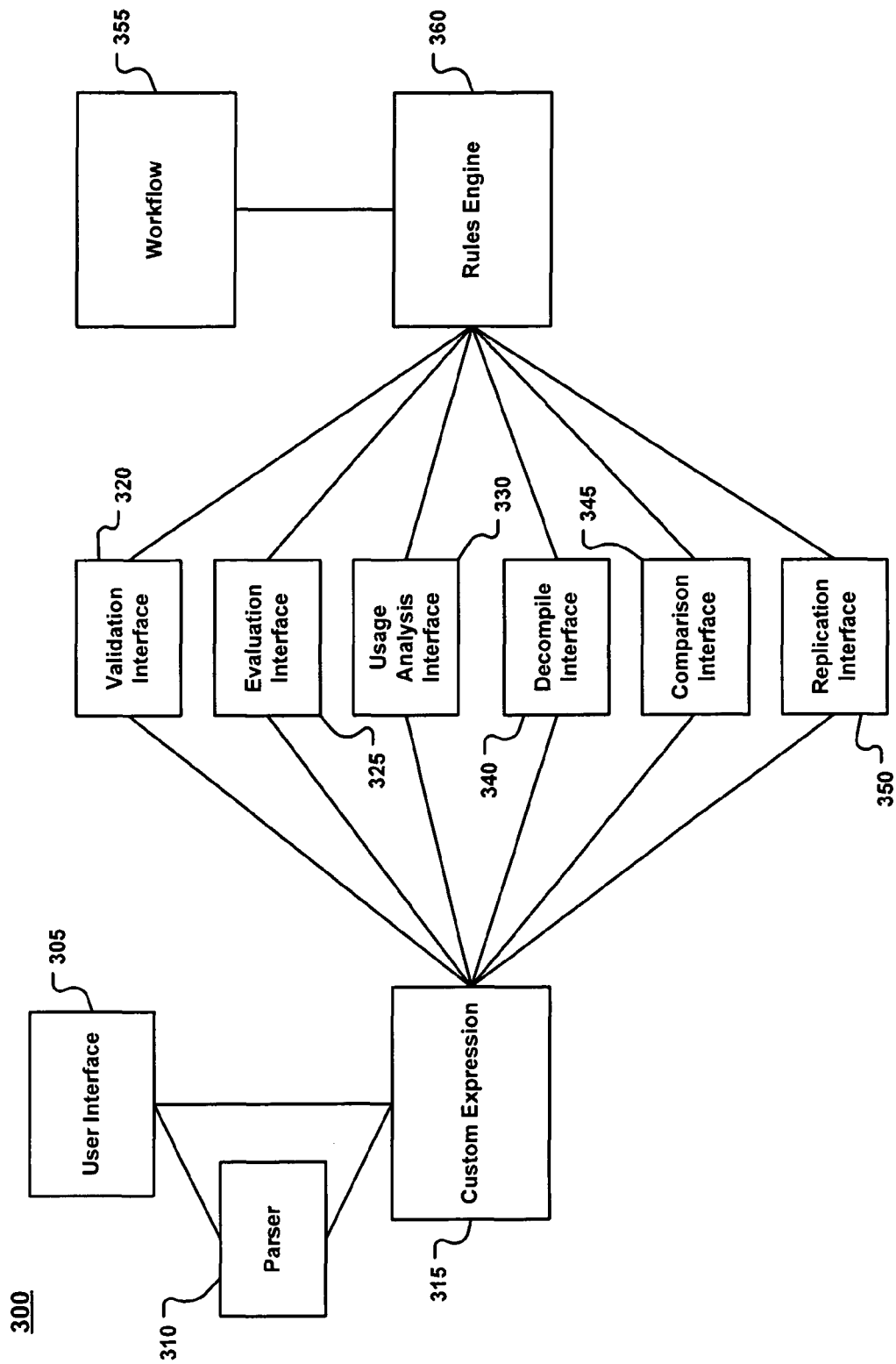

DEFINING EXTENSIBLE EXPRESSION BEHAVIOR IN A RULES SYSTEM

BACKGROUND

Virtually all software used in enterprises today has the same goal: supporting business processes. Some processes are entirely automated, relying solely on communication among applications. Others—probably the majority—also rely on people to initiate the process, approve documents the process uses, resolve any exceptional situations that arise, and more. In either case, it's often possible to specify a discrete series of steps known as a workflow that describes the activities of the people and software involved in the process. Once this workflow has been defined, an application can be built around that definition to support the business process.

One example of a workflow in use is a workflow-based application for insurance companies. FIG. 1 illustrates a simple example of a workflow 100 for an application for an automobile insurance policy. The process begins when a submitter 110 sends in an application. This submitter might be an employee in a call center, an insurance agent in the field, or even a customer directly submitting an application over the Internet. However it's done, the arrival of a new application creates a new instance of this workflow 100. The workflow 100 begins by checking the information supplied in the request against this company's rules for issuing policies 115. If the applicant fails to meet the company's underwriting criteria, he or she is rejected 120. Otherwise, the workflow 100 requests the applicant's credit 125 history from an external credit service 130. A satisfactory credit score results in immediate acceptance 135, but high-risk applicants with bad credit histories require a manager's approval 140. If this approval is granted, the applicant is accepted 145. If not, the applicant is rejected 150.

To model this and other business processes, a workflow can include a number of activities that corresponds to different steps of the business process. At each of the activities, an action (e.g., determining whether an applicant meets a specific criteria) can be taken. Clearly then, an important part of an automated workflow technology is on how decisions are made in the workflow. And usually, a rules engine is responsible for evaluating rules utilized in a workflow.

In workflow development software, it is important that the software is able to offer a workflow framework to developers that is capable of supporting diverse applications. However, under conventional approaches, workflow software products and rules engines do not allow for a developer to define custom expressions within the workflow. Instead, the developer must either be content with the "out-of-the-box" expressions packaged with the rules engine, or the developer must define a method that gets called within the workflow. Unfortunately, both of these options can be inadequate. First, out-of-the-box expressions simply may not be tailored enough towards a specific problem that a developer is seeking to solve. Secondly, traditional methods do not participate in the workflow environment the same as rules do. For instance, rules and their corresponding expressions often participate in complex validation schemes that traditional methods do not. Furthermore, traditional methods do not lend themselves as well to forward chaining mechanisms as rules do.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Described herein is technology for, among other things, enabling use of custom expressions in a rules engine. The rules engine may be used in conjunction with a workflow. The technology involves providing a custom expression with access to validation context and execution context of the workflow. The custom expression can then participate in rules engine validation and execution. Furthermore, the technology allows for variables of the custom expression to be analyzed so that the rules engine can discover the variable dependencies of the custom expression and any side effects that drive forward chaining.

Thus, the technology described above enables the use of a custom expression in a rules engine of a workflow. Embodiments allow developers to define custom expression types that coexist seamlessly alongside other out-of-the-box expression types. The mechanism by which this is enabled allows custom expressions to participate in expression validation, execution, forward chaining, and other behaviors relevant to a rule system. Furthermore, embodiments provide for custom expressions that participate in the design time process. As an added benefit, no additional special registration steps are required on the part of the developer.

BRIEF DESCRIPTION OF THE DRAWINGS

The accompanying drawings, which are incorporated in and form a part of this specification, illustrate embodiments and, together with the description, serve to explain the principles of the embodiments:

FIG. 3 shows a block diagram of an exemplary system for enabling use of a custom expression in the rules engine, in accordance with various embodiments.

DETAILED DESCRIPTION

Figure 1:
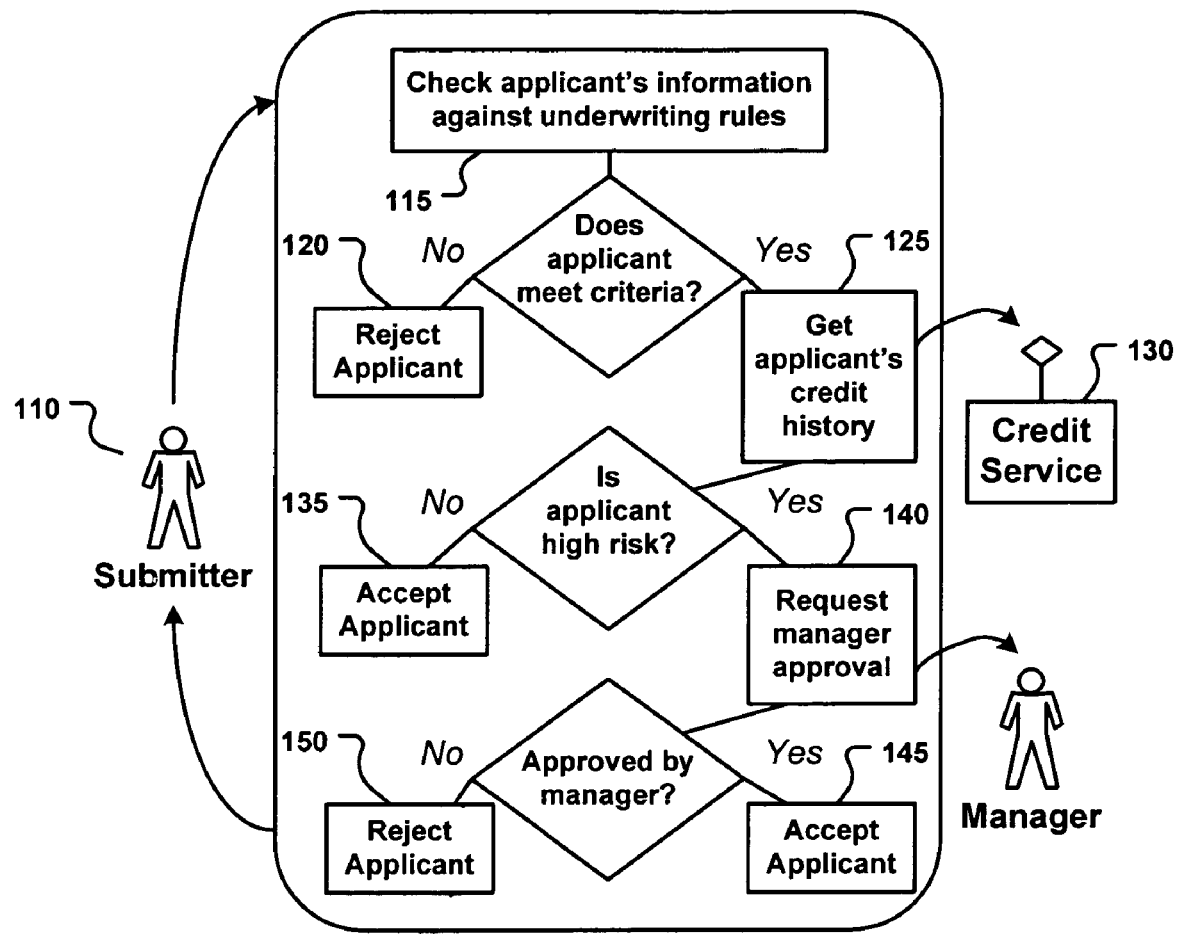
FIG. 1 is a simple example of a workflow for an application for an automobile insurance policy.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the claims. Furthermore, in the detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions that follow are presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system or similar electronic computing device. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the discussion herein, it is understood that throughout discussions of the present embodiment, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers or other such information storage, transmission, or display devices.

Described herein is technology for, among other things, enabling the use of custom expressions in a workflow. The technology involves the implementation of an interface between a custom expression and a rules engine so that the custom expression can participate in the workflow experience just as an out-of-the-box expression would.

Figure 2:
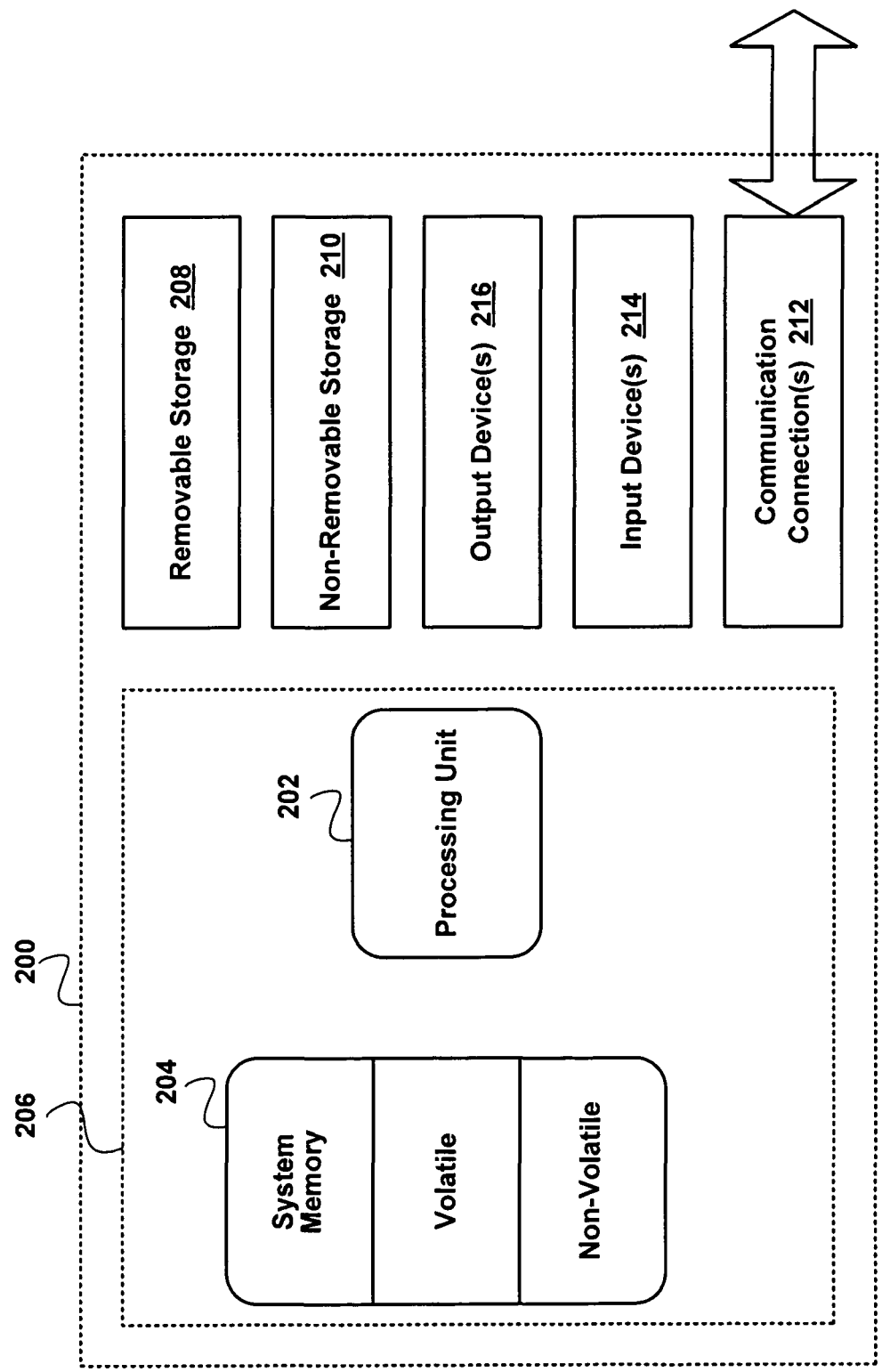
FIG. 2 is a block diagram of an exemplary system for implementing embodiments.

With reference to FIG. 2, an exemplary system for implementing embodiments includes a general purpose computing system environment, such as computing system environment 200. In its most basic configuration, computing system environment 200 typically includes at least one processing unit 202 and memory 204. Depending on the exact configuration and type of computing system environment, memory 204 may be volatile (such as RAM), non-volatile (such as ROM, flash memory, etc.) or some combination of the two. This most basic configuration is illustrated in FIG. 2 by dashed line 205. Additionally, computing system environment 200 may also have additional features/functionality. For example, computing system environment 200 may also include additional storage (removable and/or non-removable) including, but not limited to, magnetic or optical disks or tape. Such additional storage is illustrated in FIG. 2 by removable storage 208 and non-removable storage 210. Computer storage media includes volatile and nonvolatile, removable and non-removable media implemented in any method or technology for storage of information such as computer readable instructions, data structures, program modules or other data. Memory 204, removable storage 208 and nonremovable storage 210 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing system environment 200. Any such computer storage media may be part of computing system environment 200.

Computing system environment 200 may also contain communications connection(s) 212 that allow it to communicate with other devices. Communications connection(s) 212 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media. Computing system environment 200 may also have input device(s) 214 such as a keyboard, mouse, pen, voice input device, touch input device, etc. Output device(s) 216 such as a display, speakers, printer, etc. may also be included. All these devices are well known in the art and need not be discussed at length here.

Embodiments are described in terms of these example environments. Description in these terms is provided for convenience only. It is not intended that the embodiments be limited to application in this example environment. In fact, after reading the following description, it will become apparent to a person skilled in the relevant art how to implement alternative embodiments.

FIG. 3 shows a block diagram of an exemplary system 300 for enabling the use of a custom expression 315 in a rules engine 360, in accordance with various embodiments. Generally speaking, the rules engine 360 serves to manage rules. System 300 may include a workflow 355. Although aspects of exemplary system 300 may be described with respect to one or more workflows (such as workflow 355), such description is used solely for illustration, and it should be appreciated that aspects of system 300 have equal applicability without a workflow.

System 300 also includes a validation interface 320 between the custom expression 315 and the rules engine 360. The validation interface 320 is configurable to access validation context provided by the rules engine 360. In various embodiments, the validation context may include, but is not limited to, access to type information and expression information that have been discovered through previous validation processes, a target type that the custom expression is going to be executed against, errors that have occurred in previous validation processes, and the like. The validation interface 320 is also configurable to validate the custom expression 315 using the validation context. By allowing the custom expression 315 access to the validation context, the custom expression 315 may therefore richly participate in the validation protocols of the rules engine 360. For example, if custom expression 315 contains a number of sub-expressions, access to the validation context allows the custom expression 315 to in turn validate each of the sub-expressions, which may in turn then validate each of their sub-expressions.

System 300 also includes an evaluation interface 325 between the custom expression 315 and the rules engine 360. The evaluation interface 325 is configurable to access execution context provided by the rules engine 360. In various embodiments, the execution context may include, but is not limited to, access to an instance of the object that is being evaluated (e.g., an instance of workflow 355), runtime services of the instance (such as workflow 355), type information and expression information that have been discovered through previous validation processes, a target type that the custom expression 315 is going to be executed against, errors that have occurred in previous validation processes, and the like. The evaluation interface 325 is also configurable to evaluate the custom expression 315. By allowing the custom expression 315 access to the execution context, the custom expression 315 may therefore richly participate in the execution protocols of the rules engine 360. For example, custom expression 315 may seek to execute a second ruleset. Moreover, the second ruleset may actually be provided by a runtime service of the workflow 355. Having access to the execution context allows the custom expression 315 to actually tell the runtime to implement the second ruleset.

System 300 also includes a usage analysis interface 330 between the custom expression 315 and the rules engine 360. The usage analysis interface is configurable to analyze the usage of variables by the custom expression 315 and provide usage information to the rules engine 360. Once the rules engine 360 is provided with usage information from the usage analysis interface 330, the rules engine may then discover variable dependencies between the custom expression 315 and expressions of other rules. For example, having discovered variable dependencies, the rules engine 360 may then automatically reevaluate the rule using the custom expression 315 if a variable that the custom expression 315 reads from is changed. Similarly, if the custom expression 315 changes a variable that an expression of another rule reads from, the rules engine 360 may then reevaluate the other rule.

In various embodiments, system 300 may also include a decompile interface 340 between the custom expression 315 and the rules engine 360. The decompile interface 340 is configurable to decompile the expression tree of the custom expression 315 into a string representation of the custom expression. Thus, a user of system 300 may view a source text representation of the custom expression.

System 300 may also include a comparison interface 345 between the custom expression 315 and the rules engine 360. The comparison interface 345 is configurable to compare the custom expression 315 with a second expression to determine if a portion of the custom expression and the second expression are the same. If so, this information may be used for a number of purposes. For example, suppose both the custom expression 315 and the second expression perform the operation "a+b". The comparison interface 345 is thus configurable to evaluate "a+b" for one of the expressions and then replicate the result for the other expression, rather than redundantly evaluating the portion again. The value of this example operation is more greatly realized as the common operation becomes significantly more complex.

Various embodiments may also include a replication interface 350 between the custom expression 315 and the rules engine 360. The replication interface is configurable to create a clone of the custom expression 315. This becomes useful when a user desires to edit the custom expression 315 (e.g., via user interface 305). This way, the original copy of the custom expression 315 is preserved until the user is satisfied with the changes. Moreover, just as a user may edit an expression via user interface 305, the user may also create a new expression, such as custom expression 315, via the user interface 305. It should be appreciated that this may be achieved a number of ways. For example, a user may choose to create the custom expression 315 by modeling it using modeling software. A user may also choose to create the custom expression 315 by writing a traditional string representation of the expression 315. In such a case, system 300 will require a parser 310 to parse the string representation of the custom expression 315 into a form understood by the rules engine 360. In one embodiment, the string representation follows the pattern "custom-expression-type-name" followed by optional parenthesized argument expressions, which are in a form understood by the custom expression 315.

Figure 4A:
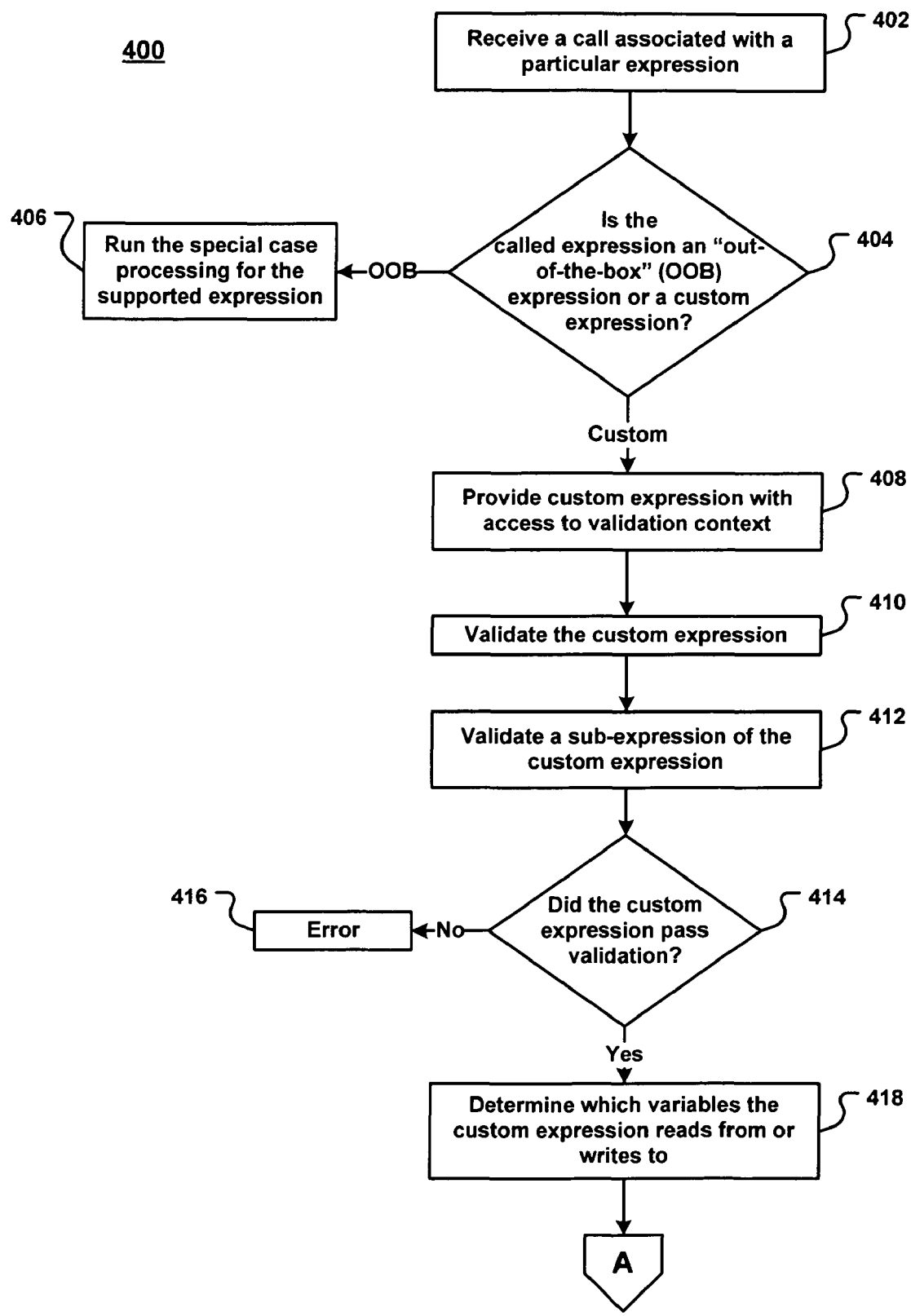
FIGS. 4A-4C illustrate a flowchart of an exemplary process for enabling the use of a custom expression in a rules engine, in accordance with various embodiments.
Figure 4B:
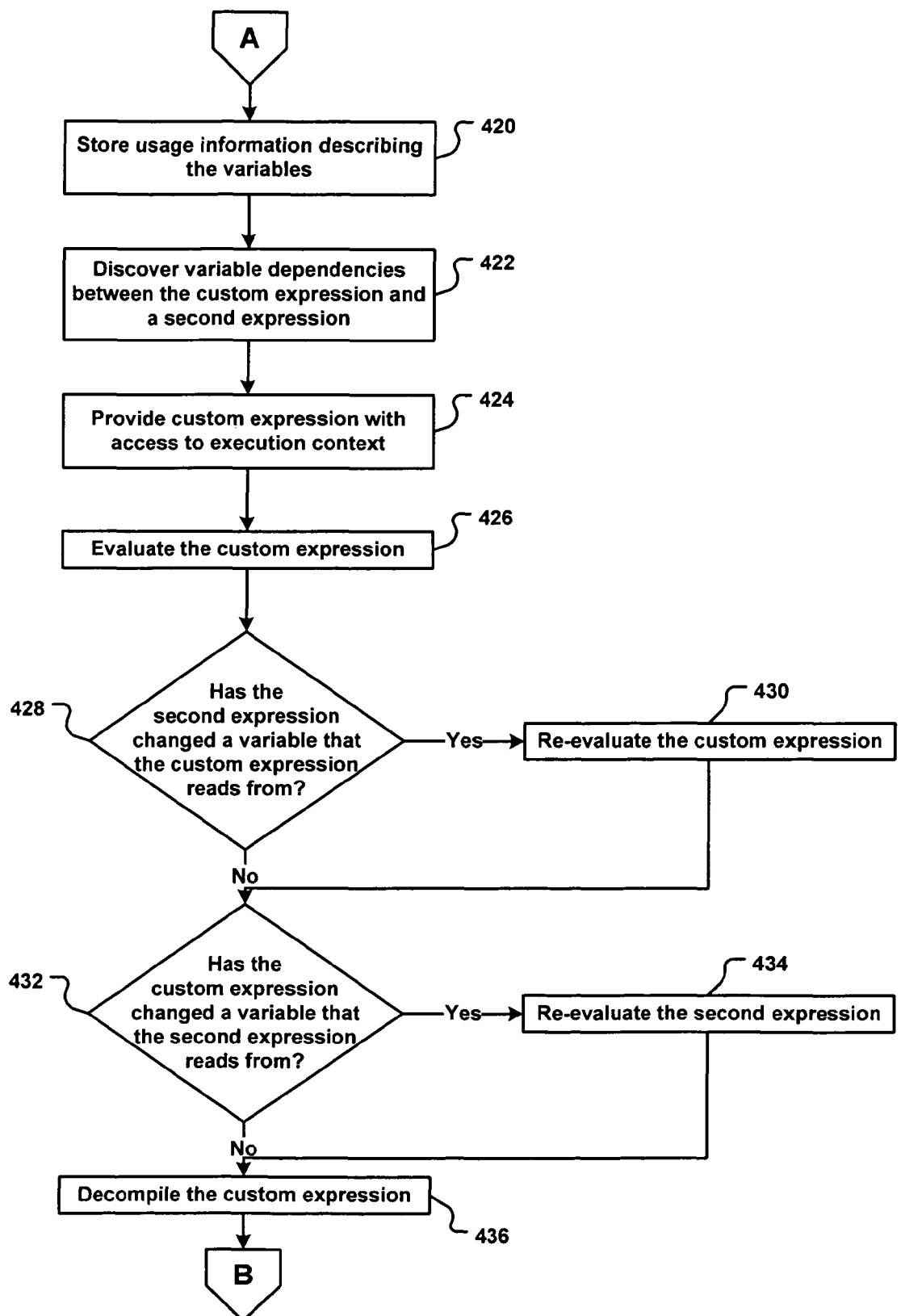
Figure 4C:
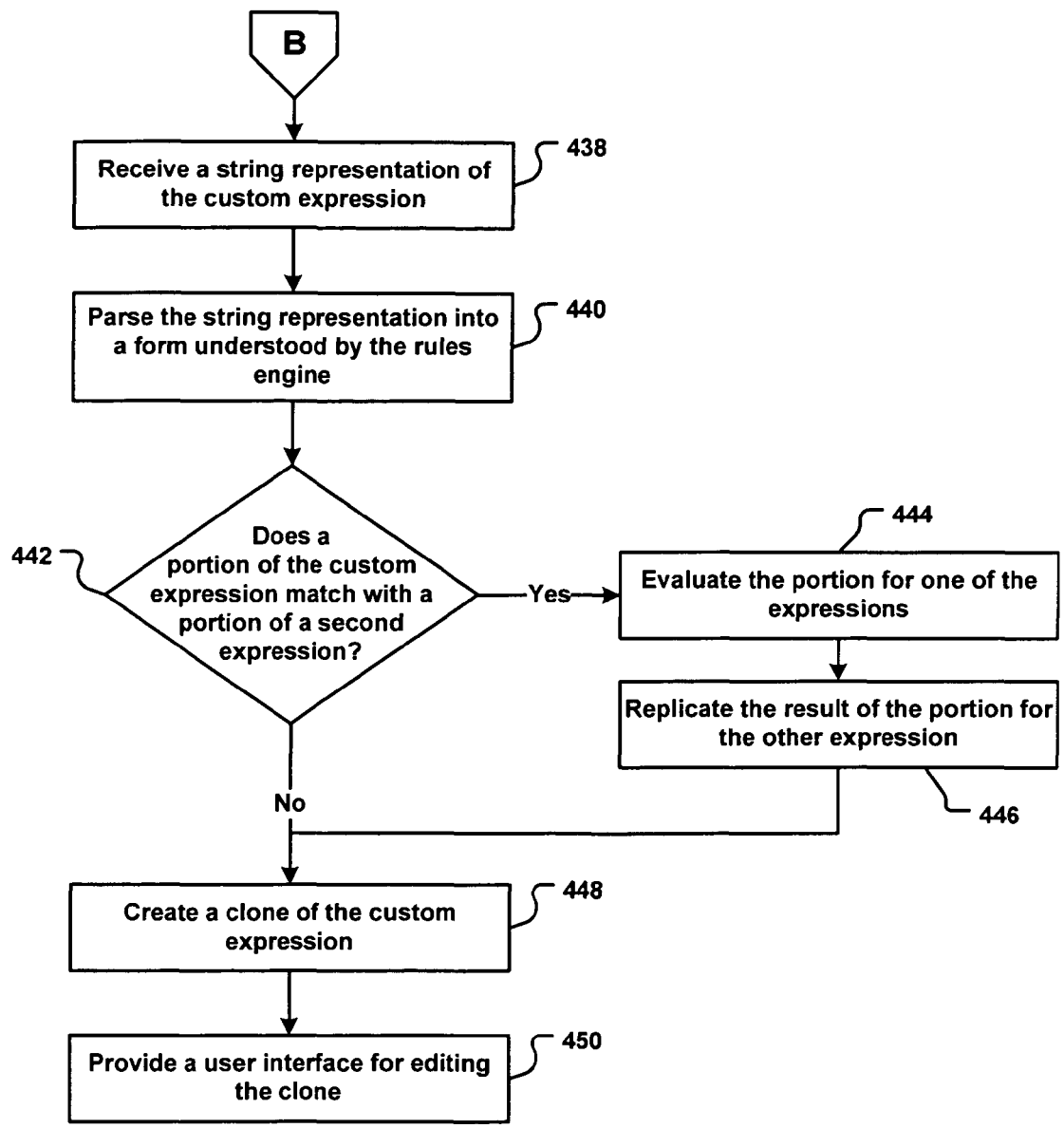

FIGS. 4A-4C illustrate a flowchart of an exemplary process 400 for enabling the use of a custom expression in a rules engine, in accordance with various embodiments. Although specific operations are disclosed in process 400, such operations are exemplary. Process 400 may not include all of the operations illustrated by FIGS. 4A-4C. Also, process 400 may include various other operations and/or variations of the operations shown by FIG. 4. Likewise, the sequence of the operations of process 400 can be modified. Moreover, although steps of process 400 may be described with respect to one or more workflows, such description is used solely for illustration, and it should be appreciated that process 400 has equal applicability outside the context of a workflow.

At block 402 of process 400, a call associated with a particular expression is received. Next, a determination is made as to whether the called expression is an out-of-the-box expression or a custom expression (block 404). If the expression is an out-of-the-box expression, process 400 proceeds to block 406, where the special case processing for the supported expression is run. If the expression is a custom expression, process 400 proceeds to block 408, where the custom expression is provided access to validation context. In various embodiments, the validation context may include, but is not limited to, access to type information and expression information that have been discovered through previous validation processes, a target type that the custom expression is going to be executed against, errors that have occurred in previous validation processes, and the like. At step 410, the custom expression is validated using the validation context. By allowing the custom expression 315 access to the validation context, the custom expression may therefore richly participate in the validation protocols of the rules engine. For example, if custom expression contains a number of some expressions, access to the validation context allows the custom expression to in turn validate each of the sub-expressions, which may in turn then validate each of their sub-expressions. In addition to validating the custom expression, any sub-expressions of the custom expression may also be validated. If the custom expression did not pass validation (decision block 414) an error is reported (block 416). Otherwise, process 400 proceeds to block 418.

At block 418, the variables that the custom expression reads from or writes to are determined. In addition to analyzing the usage of variables by the custom expression, any sub-expressions of the custom expression may also have the usage of their variables analyzed. Next, usage information describing the variables is stored (block 420). At block 422, variable dependencies are discovered between the custom expression and the second expression.

At block 424, the custom expression is provided access to execution context. In various embodiments, the execution context may include, but is not limited to, access to the usage information described above, an instance of the object that is being evaluated (e.g., an instance of a workflow), runtime services of the instance, type information and expression information that have been discovered through previous validation processes, a target type that the custom expression is going to be executed against, errors that have occurred in previous validation processes, and the like. At block 426, the custom expression is then evaluated. In addition to evaluating the custom expression, sub-expressions of the custom expression may also be evaluated. By allowing the custom expression access to the execution context, the custom expression may therefore richly participate in the execution protocols of the rules engine. For example, the custom expression may seek to execute a second ruleset. Moreover, the second ruleset may actually be provided by a runtime service of the workflow. Having access to the execution context allows the custom expression to actually tell the runtime to execute the second ruleset.

At block 428, a determination is made as to whether a second expression has changed a variable that the custom expression reads from. If so, the custom expression is reevaluated (block 430). At block 432, a determination is made as to whether the custom expression has changed a variable that the second expression reads from (block 432). If so, the second expression is reevaluated (block 434).

At block 436, the expression tree of the custom expression is decompiled into a string representation of the custom expression. Thus, a user may view a source text representation of the custom expression. Alternatively, at block 438, a string representation of the custom expression is received. In such a case, process 400 may parse the string representation into a form understood by the rules engine (block 440). In one embodiment, this may be in the form of an expression tree. In one embodiment, the string representation includes an expression type, which includes a public constructor that takes a parameter that is understood by the custom expression. This ensures that the rules engine can perform all necessary operations on the custom expression.

At block 442, a determination is made as to whether a portion of the custom expression matches with a portion of a second expression. If so, this information may be used for a number of purposes. For example, as illustrated in FIG. 4, process 400 may proceed to block 444, where the portion is evaluated for one of the expressions. Next, the result may then be replicated for that portion of the other expression (block 446), rather than redundantly evaluating the portion again. For example, suppose both the custom expression and the second expression perform the operation "a+b". The operation "a+b" is then evaluated for one of the expressions and then the result is replicated for the other expression. The value of these operations is more greatly realized when the common operation is significantly complex.

At block 448, a clone of the custom expression is created. This becomes useful when a user desires to edit the custom expression. In such a case, a user interface is thus provided for editing the clone (block 450). This way, the original copy of the custom expression 315 is preserved until the user is satisfied with the changes. As a user is creating or editing a custom expression (such as custom expression 315), system 300 may use a public constructor to determine the structural form of the custom expression. Consider for example a custom expression called "TwoOfThree", which evaluates three conditions and returns TRUE if at least two of the conditions are true. The constructor can then define for the system that, for example, the expression takes three arguments.

Thus, the technology described above enables the use of a custom expression of a rules engine of the workflow. Embodiments allow developers to define custom expression types that coexist seamlessly alongside other out-of-the-box expression types. The mechanism by which this is enabled allows custom expressions to participate in expression validation, execution, forward chaining, and other behaviors relevant to a rule system. Furthermore, embodiments provide for custom expressions that participate in the design time process. As an added benefit, no additional special registration steps are required on the part of the developer.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for enabling use of a custom expression in a rules engine, the method comprising:
   providing the custom expression with access to validation context provided by the rules engine, wherein the custom expression is defined by an expression tree;
   validating the custom expression using the validation context using at least one processing unit;
   if the custom expression passes validation:
      determining which variables the custom expression reads from or writes to,
      providing the custom expression with access to execution context, and
      evaluating the custom expression; and
   decompiling the expression tree into a string representation of the custom expression.

2. A method for enabling use of a custom expression in a rules engine, the method comprising:
   providing the custom expression with access to validation context provided by the rules engine;
   validating the custom expression using the validation context using at least one processing unit;
   if the custom expression passes validation:
      determining which variables the custom expression reads from or writes to,
      providing the custom expression with access to execution context, and
      evaluating the custom expression; and
   comparing the custom expression with a second expression to determine if a portion of the custom expression and the second expression are the same.

3. A method for enabling use of a custom expression in a rules engine, the method comprising:
   providing the custom expression with access to validation context provided by the rules engine;
   validating the custom expression using the validation context using at least one processing unit;
   if the custom expression passes validation:
      determining which variables the custom expression reads from or writes to,
      providing the custom expression with access to execution context, and
      evaluating the custom expression; and
   creating a clone of the custom expression.

4. The method as recited in claim 3 further comprising:
   providing a user interface for editing the clone.

5. A method for enabling use of a custom expression in a rules engine, the method comprising:
   providing the custom expression with access to validation context provided by the rules engine;
   validating the custom expression using the validation context using at least one processing unit;
   if the custom expression passes validation:
      determining which variables the custom expression reads from or writes to, providing the custom expression with access to execution context, and
evaluating the custom expression;
receiving a string representation of the custom expression; and
parsing the string representation into a form understood by the rules engine.

6. The method as recited in claim 5 wherein the string representation comprises an expression type, wherein further the expression type comprises a public constructor that takes a parameter that is understood by the rules engine.

7. A method for enabling use of a custom expression in a rules engine, the method comprising:
providing the custom expression with access to validation context provided by the rules engine;
validating the custom expression using the validation context using at least one processing unit; and
if the custom expression passes validation:
determining which variables the custom expression reads from or writes to,
providing the custom expression with access to execution context, and
evaluating the custom expression;
wherein the validation context comprises access to:
type information and expression information that have been discovered through previous validation processes;
a target type that the custom expression is going to be executed against; and
errors that have occurred in previous validation processes.

8. A method for enabling use of a custom expression in a rules engine, the method comprising:
providing the custom expression with access to validation context provided by the rules engine;
validating the custom expression using the validation context using at least one processing unit; and
if the custom expression passes validation:
determining which variables the custom expression reads from or writes to,
providing the custom expression with access to execution context, and
evaluating the custom expression;
wherein the execution context comprises access to:
variable dependency information describing variable dependencies between the custom expression and a second expression;
an instance of the object that is being evaluated;
runtime services of the instance;
type information and expression information that have been discovered through previous validation processes;
a target type that the custom expression is going to be executed against; and
errors that have occurred in previous validation processes.

9. A method for enabling use of a custom expression in a rules engine, the method comprising:
providing the custom expression with access to validation context provided by the rules engine;
validating the custom expression using the validation context using at least one processing unit;
if the custom expression passes validation:
determining which variables the custom expression reads from or writes to, said determining generating usage information,
providing the custom expression with access to execution context, and
evaluating the custom expression;
discovering variable dependencies between the custom expression and a second expression using the usage information;
re-evaluating the custom expression if the second expression changes a variable that the custom expression reads from; and
re-evaluating the second expression if the custom expression changes a variable that the second expression reads from.

10. A method for enabling use of a custom expression in a rules engine, the method comprising:
providing the custom expression with access to validation context provided by the rules engine;
validating the custom expression using the validation context using at least one processing unit;
if the custom expression passes validation:
determining which variables the custom expression reads from or writes to,
providing the custom expression with access to execution context, and
evaluating the custom expression;
validating a sub-expression of the custom expression;
determining which variables the sub-expression reads from or writes to; and
evaluating the sub-expression.

11. A system comprising:
at least one computer that includes at least one processing unit;
a rules engine implemented at least partially by the at least one processing unit for managing rules;
a custom expression defined by an expression tree that has an associated string representation, the string representation including a public constructor;
a validation interface for interfacing between the custom expression and the rules engine, wherein the validation interface is configurable to access validation context provided by the rules engine, wherein further the validation interface is configurable to validate the custom expression using the validation context;
an evaluation interface for interfacing between the custom expression and the rules engine, wherein the evaluation interface is configurable to access execution context provided by the rules engine, wherein further the evaluation interface is configurable to evaluate the custom expression; and
a usage analysis interface for interfacing between the custom expression and the rules engine, wherein the usage analysis interface is configurable to analyze the usage of variables by the custom expression and provide usage information to the rules engine.

12. The system as recited in claim 11 wherein the custom expression is defined by an expression tree and the system further comprises:
a decompile interface for interfacing between the custom expression and the rules engine, wherein the decompile interface is configurable to decompile the expression tree into a string representation of the custom expression.

13. The system as recited in claim 11 further comprising:
a comparison interface for interfacing between the custom expression and the rules engine, wherein the comparison interface is configurable to compare the custom expression with a second expression to determine if a portion of the custom expression in the second expression are the same.

14. The system as recited in claim 11 further comprising:
a replication interface for interfacing between the custom expression and the rules engine, wherein the replication interface is configurable to create a clone of the custom expression; and
a user interface for editing the clone.

15. The system as recited in claim 11 further comprising:
a parser for parsing a string representation of the custom expression into a form understood by the rules engine.

16. The system as recited in claim 11 wherein the rules engine is configurable to discover variable dependencies between the custom expression and a second expression using usage information obtained from the usage analysis interface, wherein further the rules engine is configurable to re-evaluate the custom expression if the second expression changes a variable that the custom expression reads from, and wherein further the rules engine is configurable to re-evaluate the second expression if the custom expression changes a variable that the second expression reads from.

17. A computer storage medium having computer-readable program code stored thereon for causing a computer system to execute a method for enabling use of a custom expression in a rules engine, comprising:
   (a) receiving a call associated with a particular expression, wherein the expression is defined by an expression tree;
   (b) determining whether the expression is custom;
   (c) if the expression is custom:
      (i) validating the expression using the validation context provided by the rules engine,
      (ii) analyzing the usage of variables by the custom expression, and
      (iii) evaluating the expression.
   (d) decompiling the expression tree into a string representation of the custom expression;
   (e) creating a clone of the custom expression;
   (f) providing a user interface for editing the clone;
   (g) receiving a string representation of the custom expression;
   (h) parsing the string representation into a form understood by the rules engine; and
   (i) comparing the custom expression with a second expression to determine if a portion of the custom expression and the second expression are the same.

18. The computer storage medium as recited in claim 17 further comprising the steps of:
   (j) evaluating the portion for one of the custom expression and the second expression; and
   (k) replicating the result of the evaluation of the portion for the other of the custom expression and the second expression.

* * * * *